US008510233B1

(12) United States Patent
Leon et al.

(10) Patent No.: US 8,510,233 B1
(45) Date of Patent: Aug. 13, 2013

(54) POSTAGE PRINTER

(75) Inventors: JP Leon, Marina del Rey, CA (US); John R. Clem, Hermosa Beach, CA (US)

(73) Assignee: Stamps.com Inc., El Segundo, CA (US)

( * ) Notice: Subject to any disclaimer, the term of this patent is extended or adjusted under 35 U.S.C. 154(b) by 1333 days.

(21) Appl. No.: 11/616,327

(22) Filed: Dec. 27, 2006

(51) Int. Cl.
*G07B 17/00* (2006.01)

(52) U.S. Cl.
USPC .......................................................... 705/410

(58) Field of Classification Search
USPC ................... 705/407, 408, 410, 62, 403, 401, 705/485; 358/1.15, 3.16, 3.19, 1.14; 235/381, 235/375; 400/61, 28, 70, 76, 124; 347/11, 347/19, 17, 16, 14, 142, 145, 180; 250/226
See application file for complete search history.

(56) References Cited

U.S. PATENT DOCUMENTS

| | | | |
|---|---|---|---|
| 3,867,882 A | | 2/1975 | Ahlgren et al. |
| 4,685,702 A | * | 8/1987 | Kazuharu ........................ 283/81 |
| 5,308,173 A | | 5/1994 | Amano et al. |
| 6,064,993 A | * | 5/2000 | Ryan, Jr. ...................... 705/403 |
| 6,208,980 B1 | | 3/2001 | Kara |
| 6,571,223 B1 | * | 5/2003 | Vaghi ............................ 705/401 |
| 7,055,746 B2 | * | 6/2006 | MacKay et al. ......... 235/462.04 |
| 7,120,611 B1 | * | 10/2006 | Vaghi ............................ 705/407 |
| 7,149,726 B1 | | 12/2006 | Lingle et al. |
| 7,190,473 B1 | * | 3/2007 | Cook et al. .................... 358/1.15 |
| 7,194,957 B1 | * | 3/2007 | Leon et al. ..................... 101/485 |
| 7,233,930 B1 | * | 6/2007 | Ryan, Jr. ....................... 705/408 |
| 7,243,842 B1 | * | 7/2007 | Leon et al. ..................... 235/381 |
| 2001/0024586 A1 | | 9/2001 | Day et al. |
| 2001/0044783 A1 | * | 11/2001 | Weisberg et al. ............... 705/62 |
| 2002/0040353 A1 | * | 4/2002 | Brown et al. .................. 705/401 |
| 2003/0024745 A1 | * | 2/2003 | Huitt et al. .................. 177/25.13 |
| 2004/0015453 A1 | * | 1/2004 | Youngblood et al. ......... 705/410 |
| 2005/0131844 A1 | * | 6/2005 | Ryan et al. .................... 705/410 |
| 2005/0278266 A1 | * | 12/2005 | Ogg et al. ..................... 705/408 |
| 2006/0111969 A1 | * | 5/2006 | Chrosny et al. ................ 705/14 |

FOREIGN PATENT DOCUMENTS

WO   WO 0137108 A1 *  5/2001

OTHER PUBLICATIONS

"Cryptographic Module for Secure Processing of Value-Bearing Items," U.S. Appl. No. 09/688,456, filed Oct. 16, 2000.

* cited by examiner

*Primary Examiner* — John Hayes
*Assistant Examiner* — David J Clark
(74) *Attorney, Agent, or Firm* — Fulbright & Jaworski LLP

(57) ABSTRACT

Embodiments of the invention involve an integrated thermal printer with a scale that is connected to a computer. The computer is connected to a web server that is authorized by a government postal agency, e.g. the USPS, to issue postage.

30 Claims, 1 Drawing Sheet

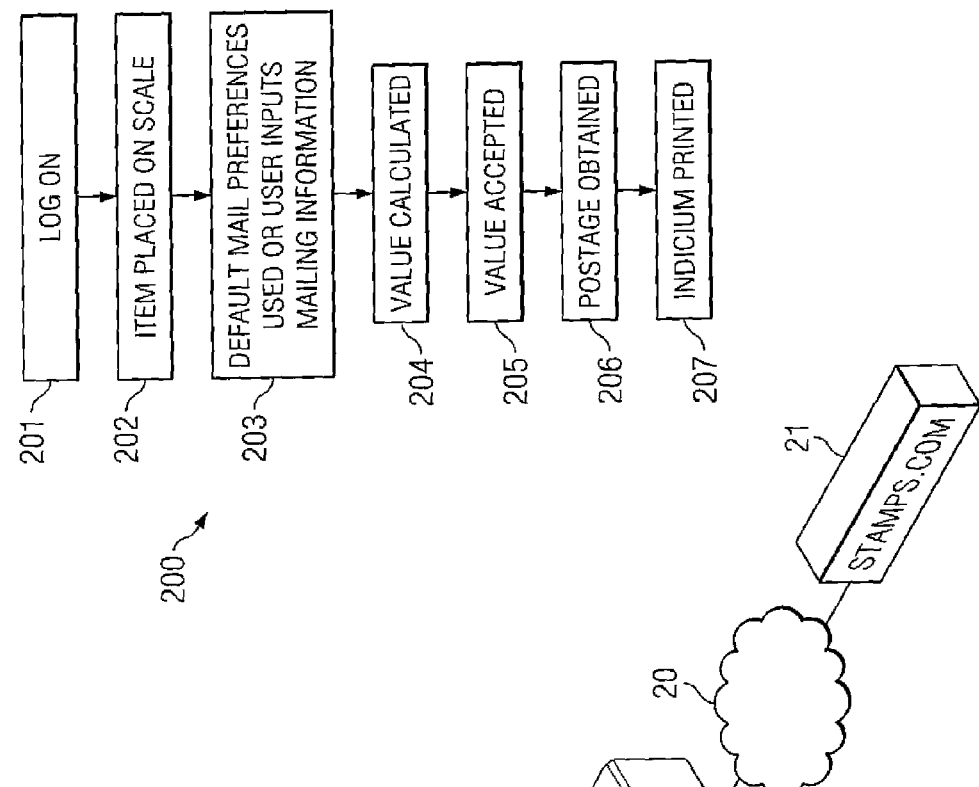
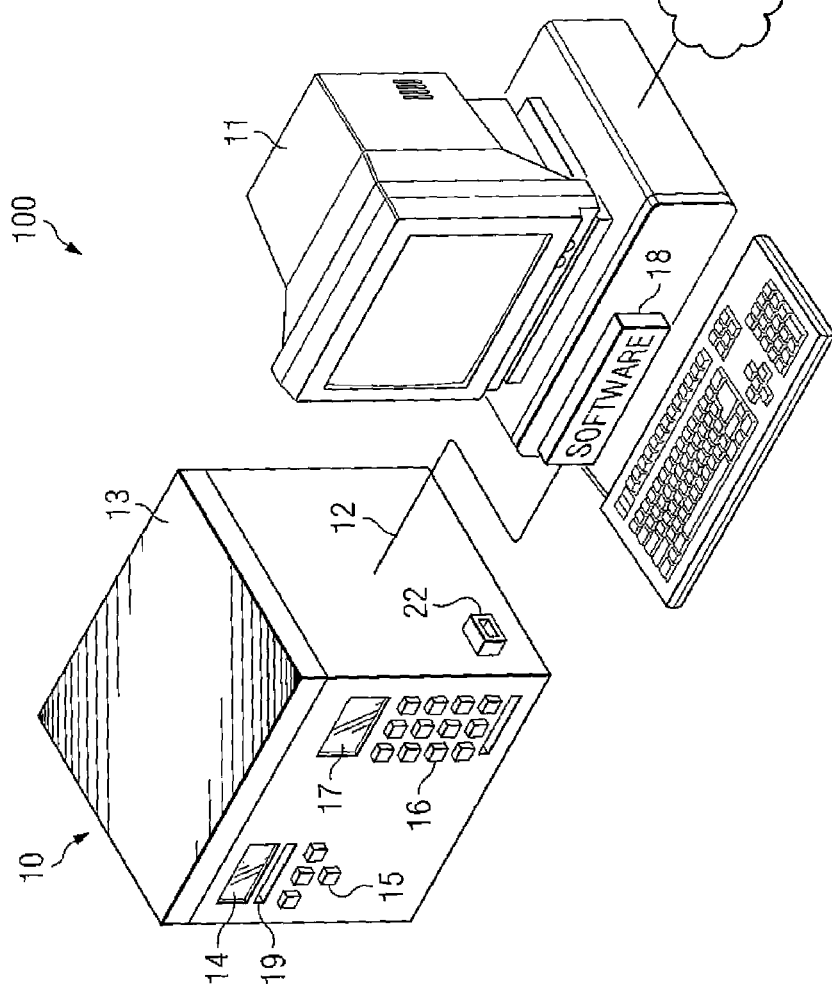

POSTAGE PRINTER

CROSS-REFERENCE TO RELATED APPLICATIONS

This application is related to co-pending and commonly assigned U.S. patent application Ser. No. 09/688,456 entitled "CRYPTOGRAPHIC MODULE FOR SECURE PROCESSING OF VALUE-BEARING ITEMS," filed Oct. 16, 2000, the disclosure of which is hereby incorporated herein by reference.

TECHNICAL FIELD

This application relates in general to printers and in specific to printers for printing postage indicia.

BACKGROUND OF THE INVENTION

Printers, including thermal printers, have been in widespread use for many years. Thermal Printers made by suppliers such as Dymo, Zebra, Seiko, Avery, and Brother have the ability to print any data feed. Typically, they do not provide any communication to outside software. In other words, the printers have their own proprietary software to print items sent as a print image. Thus, there is no communication from the printer back to the controller, e.g. a computer, as there is only communication from the controller to the printer.

Another type of postage indicia printer is a non-thermal printer that has an integrated scale. This type of printer is essentially a postage meter that prints a postage indicium. This type of printer system is dedicated to forming postage indicia for postal items.

A further type of postage indicia printer is also a non-thermal printer that comprises a computer connected to a printer. The computer is a general-purpose processor based computer that is operating under control of an instruction set that performs a postage meter function. A portion of the instruction set may be located on a postage security device (PSD) to authenticate the postage transaction.

BRIEF SUMMARY OF THE INVENTION

The present invention is directed to a system and method which comprises an integrated thermal printer with a scale that is connected to a computer. The computer is connected to a web server that is authorized by a government postal agency, e.g. the USPS, to issue postage. The value for an item to be mailed is calculated, and then sent to the authorized web server. The web server generates data that is used to form the postage indicium to be printed. The computer may form the postage indicium from the data, and provide the indicium to the printer for printing. To perform this transaction, information flows from the printer to the computer and then to the web server, and then back to the printer.

Embodiments of the invention have the security for the transaction built into the software residing on the computer and not in the printer.

Embodiments of the present invention allow for the printing USPS required data, including but not limited to a bar code, registration marks, facing indicator marks, etc., to be printed using a thermal printer.

Embodiments of the invention can be used to print an indicium on an envelope, or print an indicium onto a label, which may then be applied to an envelope.

Embodiments of the invention may use a non-thermal printer.

Embodiments of the invention may result in a cost savings from using a less expensive printing process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 depicts an exemplary system according to embodiments of the invention; and FIG. 2 depicts an exemplary method of operation of the system of FIG. 1 according to embodiments of the invention.

DETAILED DESCRIPTION OF THE INVENTION

FIG. 1 depicts an exemplary system 100 of an embodiment of the invention. System 100 comprises an integrated thermal printer/scale 10 that is connected to a computer 11 via connection 12. The computer 11 may be a personal computer, laptop computer, or other computing device. The connection 12 may be a USB connection, an RE link, a fiber optic link, a wireless link, an infra-red link, a telephone network, a local (LAN) and/or a wide-area (WAN) network, an Ethernet network, and/or the Internet network. The computer 11 may be located within the same room as the printer 10 or in a different location.

The computer 11 includes software 18 that provides authentication for the postage being printed on the printer 10. The computer 11 may calculate the value of the postage from data provided by the printer 10 using a rating engine that has current rate tables for postage. The rate tables may be automatically updated via server 21. The computer may then send the value back to the printer for acceptance by a user at the printer. Alternatively, the printer may calculate the value of the postage, and then send the value to the computer 11. In any event, the computer then communicates with server 21 to handle the authentication of the postage indicium and obtain the postage credit for the value of the postage indicium. The computer is connected via network 20, e.g. the Internet, to a server 21 that is authorized by the USPS to generate postage. Note that the computer 11 may be connected to more than one printer 10, and handle operation of the printers. Interaction between the computer 11 and the server 21 and the operation of the computer 11 and the server 21 are described in more detail in U.S. Pat. No. 7,149,726, which is hereby incorporated herein by reference in its entirety, and U.S. patent application Ser. No. 09/688,456, which is hereby incorporated herein by reference in its entirety. For example, the postage indicium data may be generated by a cryptographic module within the server 21, and then sent back to the computer 11.

The integrated thermal printer/scale 10 includes a scale 13 that is used for weighing items to be mailed. The printer portion of printer 10 includes area 14 for loading one or more rolls of thermal paper to be used for printing postage indicium or indicia. The printer 10 includes a thermal print head that may print indicia and/or labels, depending upon the type of paper that is used. The print head may be a one inch print head that will print indicia only or a two inch print head that prints both indicia and labels. The printed indicium exits the printer through cover bar 19.

The printer 10 includes interface area, which may comprise one or more of button(s), slides, touch pad(s), and dial(s) to allow a user to input data and/or control the printer 10. For example, the interface area 15 may include a power button for powering the printer, a zero button to zero the scale, a feed button to align the paper roll, a hold scale button which will retain the weight value of the item to be mailed after the item has been removed from the scale.

The printer 10 may also include a screen 17 to provide visual information to a user regarding information of the item to be mailed, and/or status of the printer. The screen 17 may be a small a LCD screen comprising two lines of twenty characters each, or the screen may be larger or smaller. The screen may display, for example, the weight of the item to be mailed, the desired mail class (e.g. first, priority, express, bulk, etc.) for the item, the type of item that is to be mailed (e.g. letter, flat, package, etc.), a quantity of items to be mailed, and the postage value for the item to be mailed.

The printer 10 may also comprise interface area 16, which may comprise one or more of button(s), slides, touch pad(s), and dial(s) to allow a user to input data and/or control the printer 10. For example, the interface area may include controls for allowing a user to select a desired mail class, a type of item, a quantity of items, and a print button that causes the printer to print the postage indicium or indicia for the item or items to be mailed. Using the interface area, the user may set a default condition, e.g. type is letter, the class is first, etc.

The printer 10 may also include one or more interfaces 22 to allow for peripheral devices to be attached to the printer. For example, one peripheral device may be a second scale. Thus, the second scale may be attached to the printer and used by the printer in weighing item(s) to be mailed. For example, the scale 13 may be a five pound scale capable of weighing items up to five pounds, while the second scale may have a larger capacity, e.g. 100 pounds. Other devices may include flash or RAM memory.

Note that the printer 10 may comprise one or more CPUs, each of which handles a particular function or set of functions of the printer. One of the CPUs may have a built-in A/D converter to allow for direct receipt of scale data. Different CPUs may also allow for future expandability and for conversion from a thermal print head to an ink jet print head. The CPUs may be any general purpose CPU, such as an Intel Pentium processor. However, the present invention is not restricted by the architecture of CPU as long as CPU supports the inventive operations as described herein. Various buses may connect the CPU(s) to memory, e.g. RAM access memory and/or ROM memory, to hold user and system data and programs. The buses may also connect the CPU(s) to one or more I/O cards which couple to user interface devices, such as the buttons 15, 16, the displays 14, 17, data ports (e.g. USB port(s), flash memory port(s)). The buses may also connect the CPU(s) to a printer controller, which controls the print head. The buses may also connect the CPU(s) to A/D converters, which allow data from one or more load cells or scales to be used by the CPU(s). The buses may also connect the CPU(s) to a communication interface, which allows a communication connection to be used by the CPU(s). The communication connection may be one or more of a telephone network, a local (LAN) and/or a wide-area (WAN) network, an Ethernet network, and/or the Internet network.

The printer 10 may print an image as a portion of the postage indicium. For example, an aesthetic picture, a personal picture, a company logo, a customized message, an effect, and/or a portion of a shipping label may be printed. Such images may be pre-loaded on the printer and/or downloaded to the printer from either the computer 11, the web server 21, or other location. The image may be edited at the printer 10 or at the computer 11. The images may be stored on internal RAM or on peripherally attached memory, e.g. flash memory. In one embodiment, a user may send an image from the computer 11 to the server 21 for approval; the image may only be printed after approval by the web server 21. Approval may be granted for images that are appropriate for use in the postage system.

FIG. 2 depicts an example of a method 200 of operation of the system 100 of FIG. 1. In 201, a user first logs on to the computer 11. This user may be the same user that will operate the printer 10 or a different user. In any event, after log on, the system 100 is ready for use. After log on, a user may place an item to be mailed on to the scale, 202. In 203, the user then inputs the mailing preferences for the item, such as item type, desired class, etc. The user may elect to use the default settings instead of making preference selections. Note 202 may be performed before during or after 203. Also note that 202 may not be performed, particularly when the weight is not critical to the item being mailed, e.g. postcards or simple first class letters.

In 204, the value for mailing the item is calculated. The value may be calculated based on the weight of the item and/or the preference information. The value may be calculated by the printer 10 or by the software 18 operating on the computer 11. If the value is calculated by the computer 11, the value may be sent to the printer 10 for display to the user. Note that the system may provide one or more values to the user. This may occur when the user does not make a selection for one or more preferences. For example, the user does not provide a preference for a mailing class. The system may then provide the user with different values based on the different classes. The user may then review each of the values and their associated mailing options and choose a desired value for the item.

In 205, the user accepts the value (or the selected value of a plurality of values) by engaging a print button, which initiates the printing of the indicium. In 206, the printer 10 communicates the acceptance to the computer 11, which then communicates with the USPS approved server 21 to obtain the postage for the transaction. The USPS approved server then debits an account or otherwise charges the appropriate entity for the postage value, generates the indicium data, and sends the indicium data with a digital signature back to the software 18. The software 18, using the indicium data, generates the postage indicium, and sends the postage indicium to the printer 10, which prints the indicium onto a medium.

In 207, the postage indicium or indicia, with the postage value, is printed by printer 10. The user then retrieves the label or indicium from the printer and attaches the label or indicium to the item(s) to be mailed.

Note that other embodiments may use non-thermal printers, such as a laser printer, a dot matrix printer, or an ink-jet printer. If a picture is desired to be printed along with the postage value, then an ink jet printer may be used.

The postage indicium that is printed by the printer 10 may be a simple indicium that includes a picture and a postage value.

The indicium may comprise a digital indicium, which may be an Information-Based Indicia (IBI). The IBI is a fully (or at least partially) computer-readable mark, e.g. a bar code, which comprises postal information that is digitally signed, which provides security to the postage system and reducing the risks of forgery, meter tampering, and unauthorized use. Each IBI may be unique and may include information such as one or more of a date, a time, a printer registration number, a user number, a source address, a destination address, mailing information (e.g. postage value, class, weight, size of the envelope, and/or number of pages, etc.), an IBI serial number, a digital signature, zip code, tracking information, and special services information (e.g. insurance, return receipt, certified mail, registered, express mail, or other services). In other words, the bar code may be dynamic in that it is based on the moment of creation and, thus each bar code will be different. The bar code may have a Data Matrix format, a two-dimensional bar code format, or a one-dimensional bar code format.

The printed indicium may comprise other elements along with the bar code, for example human readable information, and registration marks. The human readable information may be information desired by the USPS or by the mailer or shipper. Examples of human readable information include a company logo, a watermark, etc. The registration marks such as facing indication marks could be also printed, as well as other features that are not useful to a customer or aesthetically pleasing to a customer.

Postage may be purchased or added at either the printer 10 or the computer 11. A user may swipe a credit card at an attached credit card reader located at either the printer or the computer and enter a desired amount. The value may be tracked at the computer 11 and/or the server 21. The user may pre-authorize a credit account to be debited for a user-defined amount as needed.

Note that embodiments of the invention may be used to print the indicia for envelopes, or other shipping containers such as packages, boxes, cartons, tubes, etc. Embodiments of the invention may be used to print the indicia onto labels, which are then applied to envelopes, or other shipping containers such as packages, boxes, cartons, tubes, etc.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for printing a postage indicium for an item to be mailed comprising:
   a server that is authorized to generate postage data;
   a printer having an integrated scale for weighing the item and an interface for inputting at least one mailing preference for the item;
   a computer that is connected to the printer via a communication line and is connected to the server via a network connection, wherein the computer receives information regarding the at least one mailing preference from the printer and cooperates with the server to form the postage indicium using the information regarding the at least one mailing preference;
   whereby the printer prints the postage indicium after receiving the postage indicium from the computer.

2. The system of claim 1, wherein the computer calculates the postage value based on the weight of the item and the at least one mailing preference and using rate tables.

3. The system of claim 2, wherein the rate tables are updated by the server.

4. The system of claim 1, wherein the network connection between the computer and the server is the Internet.

5. The system of claim 1, wherein the system comprises a plurality of printers, each of which is connected to the computer and each of which has an integrated scale for weighing items and interfaces for inputting mailing preferences for the items.

6. The system of claim 1, wherein the postage indicium includes an user selected image.

7. The system of claim 6, wherein the user selected image has been approved by the server.

8. The system of claim 6, wherein the image is selected from the group consisting of:
   an aesthetic picture, a personal picture, a company logo, a customized message, an effect, and a portion of a shipping label.

9. The system of claim 1, wherein the printer includes an interface to allow for another scale to be used with the system.

10. The system of claim 1, wherein the printer includes a plurality of buttons and at least one screen to allow for user interaction with the printer.

11. The system of claim 1, wherein the printer is a thermal printer.

12. The system of claim 1, wherein the computer includes software for authenticating the postage indicium.

13. The system of claim 1, wherein the postage indicium comprises at least one of:

a date, a time, a component registration number, a user number, an item source address, an item destination address, a mailing class, a postage value for the item, a weight of the item, a size of the envelope of the item, a number of letter pages in the item, a postage indicia serial number, a digital signature, zip code, tracking information, and special services information.

14. The system of claim 1, wherein the postage indicium is a data matrix bar code.

15. The system of claim 1, wherein the server is authorized by a government mail agency.

16. A method for printing a postage indicium comprising:
weighing an item to be mailed at a printer;
selecting, through operation of a printer user interface, at least one mailing preference for the item at the printer;
calculating at least one postage rate for the item, at a computer that is connected to the printer, using the weight of the item and the at least one mailing preference;
providing the at least one postage rate for the item to the printer for acceptance, by a user, of a postage rate to be used for the postage indicium;
accepting, through operation of the printer user interface, the postage rate at the printer;
generating postage data, at a server that is connected to the computer, based on the accepted postage rate;
generating, at the computer, the postage indicium, having the accepted postage rate, based on the postage data; and
printing the postage indicium at the printer.

17. The method of claim 16, further comprising:
displaying to a user, at the printer, a plurality of postage rates, based on the weight of the item and the at least one mailing preference.

18. The method of claim 16, further comprising:
selecting an image, by a user, that is to be printed with the postage indicium.

19. The method of claim 16, further comprising:
logging on to the computer, prior to the calculating.

20. The method of claim 16, wherein selecting comprises:
inputting, by a user, the at least one mailing preference.

21. The method of claim 16, wherein selecting comprises:
selecting, by a user, at least one default mailing preference.

22. The method of claim 16, further comprising:
charging the postage rate to an account at the server.

23. The method of claim 22, further comprising:
adding value to the account at one of the printer and the computer.

24. A printer for printing a postage indicium for an item to be mailed comprising:
a scale for weighing the item;
a user interface adapted for input of at least one mailing preference for the item, display of at least one postage rate for the item, and acceptance of a postage rate of the at least one postage rate for the item, the at least one mailing preference being selected from the group consisting of an item type, a desired class, and a number of items;
a computer interface that is operable to connect the printer to a computer, which allows the weight of the item and the at least one mailing preference to be provided to the computer, and which allows a postage indicium to be provided to the printer from the computer, wherein said postage indicium is created utilizing said weight and said user preference; and
a print head for printing the postage indicium onto a medium used with the item.

25. The printer of claim 24, wherein the printer is a thermal printer.

26. The printer of claim 24, further comprising:
an interface to allow for another scale to be used with the printer.

27. The printer of claim 24, wherein the user interface comprises:
a screen for displaying information to a user, the information including the at least one postage rate for the item.

28. The system of claim 1 wherein said server receives said mailing preference.

29. The system of claim 28 wherein said server utilizes said mailing preference in generating said postage data.

30. The system of claim 1 wherein said mailing preference is utilized in forming said postage indicium.

* * * * *

UNITED STATES PATENT AND TRADEMARK OFFICE
CERTIFICATE OF CORRECTION

| | | |
|---|---|---|
| PATENT NO. | : 8,510,233 B1 | Page 1 of 1 |
| APPLICATION NO. | : 11/616327 | |
| DATED | : August 13, 2013 | |
| INVENTOR(S) | : Leon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1469 days.

Signed and Sealed this
Twenty-fourth Day of February, 2015

Michelle K. Lee
*Deputy Director of the United States Patent and Trademark Office*